(12) United States Patent
Peng et al.

(10) Patent No.: US 8,300,173 B2
(45) Date of Patent: Oct. 30, 2012

(54) REFLECTIVE LIQUID CRYSTAL DISPLAY DEVICE INTEGRATED WITH ORGANIC LIGHT-EMITTING DEVICE

(75) Inventors: Du-Zen Peng, Jhubei (TW); Ryuji Nishikawa, Hsinchu (TW)

(73) Assignee: Chimei Innolux Corporation, Miao-Li County (TW)

( * ) Notice: Subject to any disclaimer, the term of this patent is extended or adjusted under 35 U.S.C. 154(b) by 268 days.

(21) Appl. No.: 12/783,613

(22) Filed: May 20, 2010

(65) Prior Publication Data
US 2010/0302483 A1 Dec. 2, 2010

(30) Foreign Application Priority Data
May 26, 2009 (TW) .............................. 98117410 A

(51) Int. Cl.
*G02F 1/1335* (2006.01)
(52) U.S. Cl. ....................................................... 349/63
(58) Field of Classification Search ............ 349/69, 349/63
See application file for complete search history.

(56) References Cited

U.S. PATENT DOCUMENTS
7,630,027 B2 * 12/2009 Koma .............................. 349/69
* cited by examiner

*Primary Examiner* — James Dudek
(74) *Attorney, Agent, or Firm* — Thomas|Kayden

(57) ABSTRACT

A system for displaying images is provided. The system includes a reflective liquid crystal display device including a first substrate having a pixel unit array thereon. A second substrate is disposed above the first substrate and a liquid crystal layer is disposed therebetween. A plurality of first electrodes is disposed between the second substrate and the liquid crystal layer and corresponds to each pixel unit including a reflective electrode. A second electrode is disposed between the plurality of first electrodes and the liquid crystal layer to serve as a common electrode that controls the liquid crystal layer. An organic light-emissive layer is disposed between the plurality of first electrodes and the second electrode. A light-emitting device is constituted by the plurality of first electrodes, the second electrode, and the organic light-emissive layer to provide light onto the reflective electrode.

18 Claims, 3 Drawing Sheets

REFLECTIVE LIQUID CRYSTAL DISPLAY DEVICE INTEGRATED WITH ORGANIC LIGHT-EMITTING DEVICE

This Application claims priority of Taiwan Patent Application No. 098117410, filed on May 26, 2009, the entirety of which is incorporated by reference herein.

BACKGROUND OF THE INVENTION

1. Field of the Invention

The invention relates to flat panel displays (FPD), and in particular to a reflective liquid crystal display (LCD) device integrated with a front light device.

2. Description of the Related Art

Liquid crystal displays (LCDs) are widely employed in electronic products, such as portable personal computers, personal digital assistants (PDAs), mobile phones, and the like, due to their thin profiles, light weights and low power consumption when compared to other types of displays. Typically, LCD devices are classified into transmissive and reflective types. The former utilizes a backlight as a light source and the latter utilizes ambient light. Transmissive LCD devices exhibit a high contrast ratio and good color saturation. However, it is difficult to decrease power consumption thereof due to backlight power requirements.

Unlike transmissive LCD devices, reflective LCD devices have a power-saving advantage due to the use of ambient light as the light source under bright ambient light. However, in order to operate reflective LCD devices under dark ambient conditions, an additional front light module is required. Thus, it is difficult to reduce total display thickness thereof and reduce manufacturing cost thereof.

With the progress of electronic applications, such display profile, weight, and power consumption cannot meet the current demands. Accordingly, there exists a need in the art for development of an improved LCD device, capable of reducing total display thickness, display weight, and display power consumption.

BRIEF SUMMARY OF THE INVENTION

A detailed description is given in the following embodiments with reference to the accompanying drawings. A system for displaying images is provided. An exemplary embodiment of a system for displaying images comprises a reflective liquid crystal display device comprising a first substrate having a pixel unit array thereon. A second substrate is disposed above the first substrate. A liquid crystal layer is disposed between the first substrate and the second substrate. A plurality of first electrodes is disposed between the second substrate and the liquid crystal layer and corresponds to each pixel unit of the pixel unit array, in which each pixel unit includes a reflective electrode. A second electrode is disposed between the plurality of first electrodes and the liquid crystal layer to serve as a common electrode that controls the liquid crystal layer. An organic light-emissive layer is disposed between the plurality of first electrodes and the second electrode. A light-emitting device is constituted by the plurality of first electrodes, the second electrode, and the organic light-emissive layer to provide light onto the reflective electrode.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1:
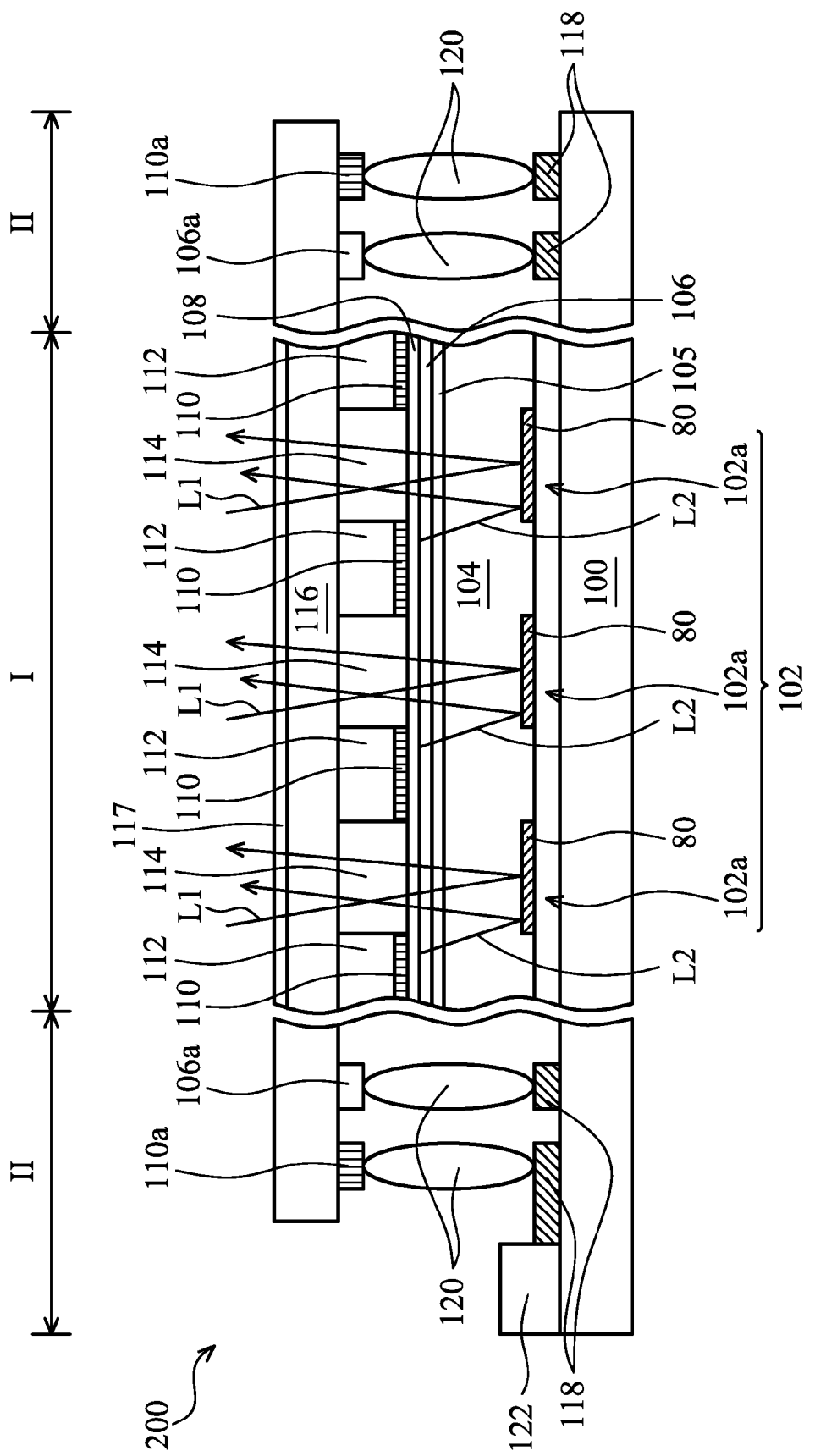
FIG. 1 is a cross section of an embodiment of a system for displaying images including a reflective liquid crystal display device according to the invention.

Systems for displaying images are provided. Referring to FIG. 1, which is a cross section of an embodiment of a reflective liquid crystal display (LCD) device 200 according to the invention. In the embodiment, the reflective LCD device 200 comprises a first substrate 100, a second substrate 116, a liquid crystal layer 104, and a light-emitting device serving as a front light source.

The first substrate 100 has a display region I and a non-display region II, and may comprise glass, quartz, or other transparent materials. A pixel unit array 102 is on the first substrate 100 and located at the display region I. A plurality of metal redistribution lines 118 and a flexible printed circuit (FPC) 122 electrically connected thereto are on the first substrate 100 and located at the non-display region II.

Figure 2:
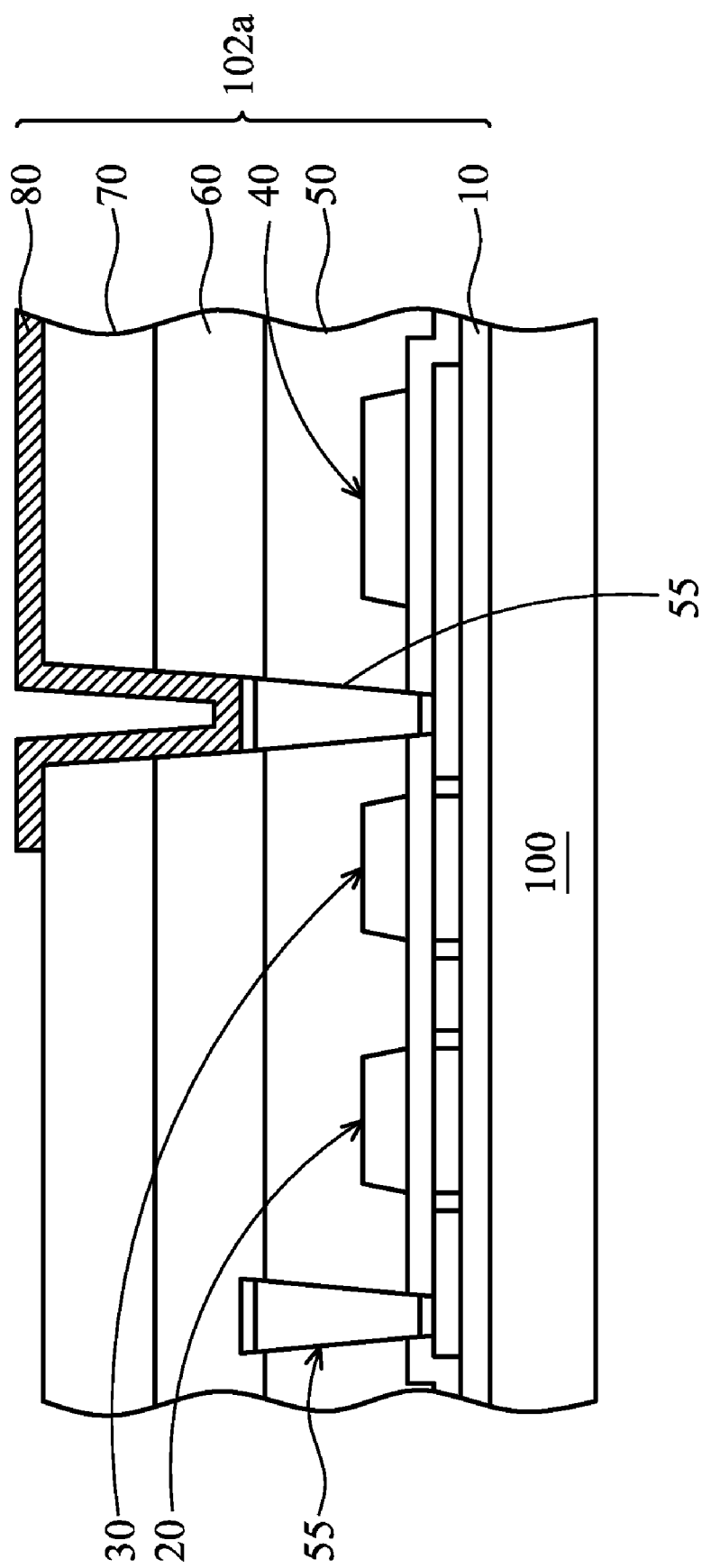
FIG. 2 is a cross section of a pixel unit shown in FIG. 1.

Referring to FIG. 2, which illustrates a cross section of a pixel unit 102a shown in FIG. 1. In one embodiment, a pixel unit 102a may comprise two thin film transistors (TFTs) 20 and 30, a storage capacitor 40, and a pixel electrode 80. The TFTs 20 and 30 and the storage capacitor 40 is usually adhered onto the first substrate 100 by a buffer layer 10. A first intervening layer 50, a second intervening layer 60, and a protective layer 70 are successively stacked on the TFTs 20 and 30 and the storage capacitor 40. The pixel electrode 80 is disposed on the protective layer 70 to serve as a reflective electrode of the reflective LCD device 200 and may comprise an opaque reflective material, such as metal. In some embodiments, the pixel electrode 80 may comprise an opaque material and a transparent material such as indium tin oxide (ITO). Moreover, the pixel electrode 80 is electrically connected to the TFTs 20 and 30 and the storage capacitor 40 by conductive plugs 55 formed in the first intervening layer 50 and the second intervening layer 60.

The second substrate 116 may also comprise glass, quartz, or other transparent materials. In the embodiment, a color filter array 114 may be disposed on the second substrate 116 and correspondingly face to the pixel unit array 102 on the first substrate 100. A black matrix (BM) 112 is also disposed on the second substrate 116 and between the color filters of the color filter array 114. The surface of the black matrix 112 adjacent to the second substrate 116 has a reflective index less than 20% and the black matrix 112 may comprise chromium oxide, chromium nitride, titanium nitride, molybdenum nitride, or resin. In another embodiment, the color filter array may be correspondingly disposed on the pixel unit array 102 on the first substrate 100.

A first electrode redistribution line 110a and a second redistribution line 106a are disposed on the second substrate 116 and correspond to the non-display region II, thereby electrically connecting different metal distribution lines 118 on the first substrate 100. In one embodiment, the first electrode redistribution line 110a and the second redistribution line 106a are electrically connected to the metal distribution lines 118 by metal pastes 120. In another embodiment, the first electrode redistribution line 110a and the second redistribution line 106a are electrically connected to the metal distribution lines 118 by anisotropic conductive films (ACF) (not shown).

The liquid crystal layer 104 is disposed between the first substrate 100 and the second substrate 116. In the embodiment, a light-emitting device may be disposed between the second substrate 116 and the liquid crystal layer 104 to provide another light source L2 onto the pixel electrode 80 (i.e. reflective electrode) of the reflective LCD device 200, in addition to using the ambient light as a light source L1 for the reflective LCD device 200. The light-emitting device may comprise a plurality of first electrodes 110, a second electrode 106, and an organic light emissive layer 108. The plurality of first electrodes 110 is disposed between the black matrix 112 and the liquid crystal layer 104 and corresponds to each pixel unit 102a of the pixel unit array 102. In the embodiment, the plurality of first electrodes 110 serves as an anode of the light-emitting device and is electrically connected to the first electrode redistribution line 110a. The plurality of first electrodes 110 and the first electrode redistribution line 110a may be formed by the same conductive layer that comprises ITO or indium zinc oxide (IZO). In one embodiment, each first electrode 110 has a reflective index greater than 70% and comprises aluminum, argentum, chromium, titanium, molybdenum, an alloy thereof, or a combination thereof. Accordingly, the black matrix may be replaced by the plurality of first electrodes 110.

The second electrode 106 serves as a cathode of the light-emitting device, and is disposed between the plurality of first electrodes 110 and the liquid crystal layer 104, and is electrically connected to the second electrode redistribution line 106a. Also, the second electrode 106 and the second electrode redistribution line 106a may be formed by the same conductive layer that comprises ITO or IZO. In particular, the second electrode 106 of the light-emitting device may also serve as a common electrode that controls the liquid crystal layer 104.

The organic light emissive layer 108 is disposed between the plurality of first electrodes 110 and the second electrode 106. In some embodiments, the single organic light emissive layer 108 can be replaced by a plurality of organic light emissive patterned layers (not shown) corresponding to the plurality of first electrodes 110.

An insulating layer 105 is disposed between the second electrode 106 and the liquid crystal layer 104 to serve as a protective layer and/or an alignment film of the reflective LCD device 200. The insulating layer 105 may comprise silicon nitride, silicon oxynitride, polyimide (PI), or a combination thereof.

Additionally, an optical film 117, such as a polarizer, an anti-reflection film, or an anti-glare film, is optionally adhered onto the surface of the second substrate 116 corresponded to the display region I and faces to the view sides of the reflective LCD device 200.

According to the embodiments, since an organic light-emitting device is used as a light source for the reflective LCD device, the weight and power consumption of the display can be reduced when compared to a conventional reflective LCD device using a front light module as a light source. Moreover, since the organic light-emitting device is disposed between the two substrates of the reflective LCD device and since one of the electrodes of the organic light-emitting device is used as a common electrode of the reflective LCD device, the total display thickness can be reduced manufacturing costs can be saved when compared to the conventional reflective LCD device where the front light module is disposed outside of the two substrates of the reflective LCD device.

Figure 3:
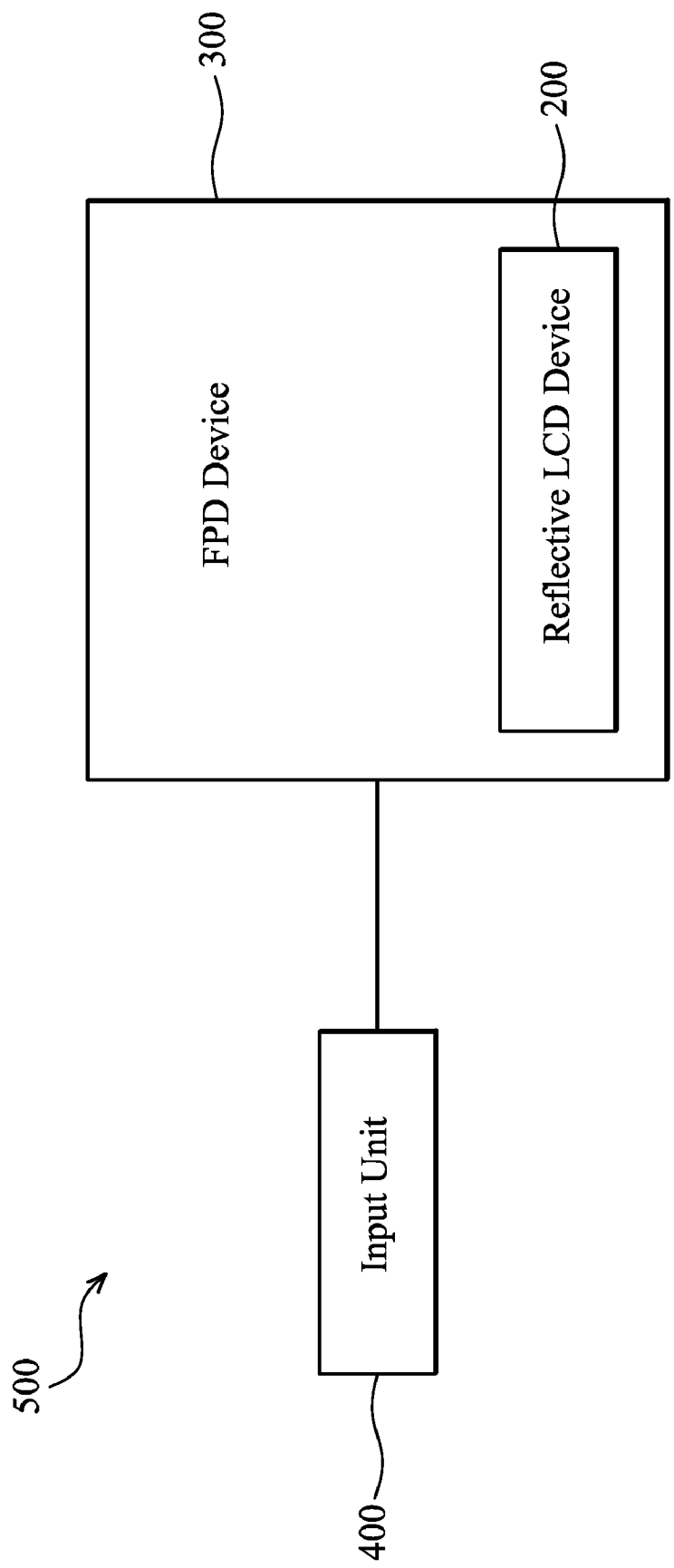
FIG. 3 schematically shows another embodiment of a system for displaying images.

FIG. 3 schematically shows another embodiment of a system for displaying images which, in this case, is implemented as a flat panel display (FPD) device 300 or an electronic device 500 such as a laptop computer, a mobile phone, a digital camera, a personal digital assistant (PDA), a desktop computer, a television, a car display or a portable DVD player. The described reflective liquid crystal display (LCD) device 200 can be incorporated into the FPD device 300 which can be an LCD. In some embodiments, the reflective LCD device 200 can be incorporated into the electronic device 500. As shown in FIG. 3, the electronic device 500 comprises the FPD device 300 and an input unit 400. Moreover, the input unit 400 is coupled to the FPD device 300 and is operative to provide input signals (e.g. image signals) to the FPD device 300 to generate images.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
a reflective liquid crystal display device, comprising:
a first substrate having a pixel unit array thereon;
a second substrate disposed above the first substrate;
a liquid crystal layer disposed between the first substrate and the second substrate;
a plurality of first electrodes disposed between the second substrate and the liquid crystal layer and corresponding to each pixel unit of the pixel unit array, wherein the each pixel unit comprises a reflective electrode;
a second electrode disposed between the plurality of first electrodes and the liquid crystal layer to serve as a common electrode that controls the liquid crystal layer; and
an organic light-emissive layer disposed between the plurality of first electrodes and the second electrode,
wherein a light-emitting device is constituted by the plurality of first electrodes, the second electrode, and the organic light-emissive layer to provide light onto the reflective electrode.

2. The system of claim 1, wherein the first substrate has a color filter array thereon and corresponds to the pixel unit array.

3. The system of claim 1, wherein the second substrate has a color filter array thereon and corresponds to the pixel unit array.

4. The system of claim 1, wherein each first electrode has a reflective index greater than 70%.

5. The system of claim 4, wherein the second substrate has a black matrix between the plurality of first electrodes and the second substrate, and the surface of the black matrix adjacent to the second substrate has a reflective index less than 20%.

6. The system of claim 5, wherein each first electrode comprises indium tin oxide or indium zinc oxide.

7. The system of claim 5, wherein the black matrix comprises chromium oxide, chromium nitride, titanium nitride, molybdenum nitride, or resin.

8. The system of claim 1, wherein the first electrode comprises aluminum, argentum, chromium, titanium, molybdenum, an alloy thereof, or a combination thereof.

9. The system of claim 1, wherein the second electrode comprises indium tin oxide or indium zinc oxide.

10. The system of claim 1, wherein the reflective liquid crystal display device further comprises an insulating layer disposed between the second electrode and the liquid crystal layer.

11. The system of claim 10, wherein the insulating layer comprises silicon nitride or silicon oxynitride.

12. The system of claim 10, wherein the insulating layer comprises polyimide to serve as an alignment layer of the reflective liquid crystal display device.

13. The system of claim 1, wherein the reflective liquid crystal display device further comprises an optical layer adhered to the surface of the second substrate.

14. The system of claim 1, wherein the second substrate has a first electrode redistribution line and a second electrode redistribution line, and the first substrate has a plurality of metal redistribution lines and a flexible printed circuit electrically connected thereto.

15. The system of claim 14, wherein the first electrode redistribution line and the second electrode redistribution line are electrically connected to different metal redistribution lines by metal pastes or anisotropic conductive films.

16. The system as claimed in claim 1, further comprising:
a flat panel display device comprising the reflective liquid crystal display device; and
an input unit coupled to the flat panel display device and operative to provide input singles to the flat panel display device, such that the flat panel display device displays images.

17. The system of claim 16, wherein the system comprises an electronic device comprising the flat panel display device.

18. The system of claim 17, wherein the electronic device is a laptop computer, a mobile phone, a digital camera, a personal digital assistant, a desktop computer, a television, a car display or a portable DVD player.

* * * * *